United States Patent [19]

Schneider et al.

[11] 4,070,926
[45] Jan. 31, 1978

[54] SWING CONTROL FOR CRANE

[75] Inventors: Raymond C. Schneider; Paul A. Pelligrino, both of Rockford, Ill.

[73] Assignee: Twin Disc, Incorporated, Racine, Wis.

[21] Appl. No.: 643,357

[22] Filed: Dec. 22, 1975

[51] Int. Cl.² ............................................. F16H 47/00
[52] U.S. Cl. ........................................ 74/730; 74/867; 192/109 F
[58] Field of Search ................. 74/866, 867, 730, 732; 192/3.57, 3.58, 3.3, 109 F

[56] References Cited

U.S. PATENT DOCUMENTS

| 3,621,955 | 11/1971 | Black et al. | 192/109 F X |
| 3,820,417 | 6/1974 | Allen et al. | 192/109 F X |
| 3,951,009 | 4/1976 | Audifferd et al. | 74/730 X |

Primary Examiner—Samuel Scott
Assistant Examiner—Frank H. McKenzie, Jr.
Attorney, Agent, or Firm—James E. Nilles

[57] ABSTRACT

A power transmission system for swinging the upper section of a mobile crane in opposite directions comprises a prime mover, a torque converter, a modulatable torque converter clutch connected between the prime mover and the torque converter, and a transmission connected to be driven by the torque converter and including a pair of alternately actuatable modulatable transmission clutches therein. The torque converter clutch is modulatable between disengaged and engaged positions. Each transmission clutch is modulatable between a minimum engaged position and a fully engaged position. Selectively operable control means are provided for modulating the torque converter clutch and a selected one of the transmission clutches to swing the crane upper in a desired direction. The control means effect full engagement of the selected transmission clutch prior to full engagement of the torque converter clutch. The control means further include means for sensing torque converter output speed (transmission input speed) and for governing modulation of the torque converter clutch accordingly.

8 Claims, 13 Drawing Figures

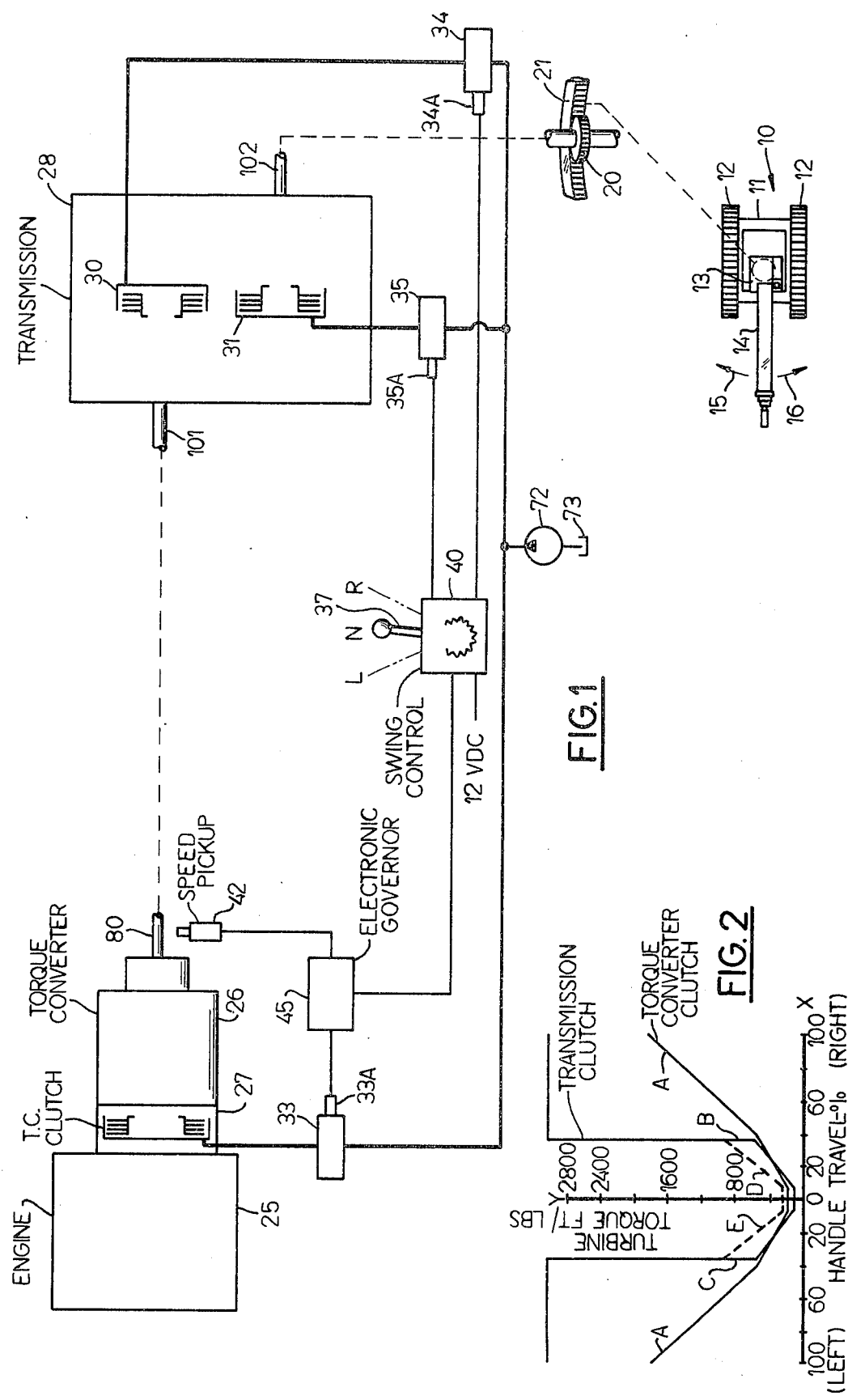

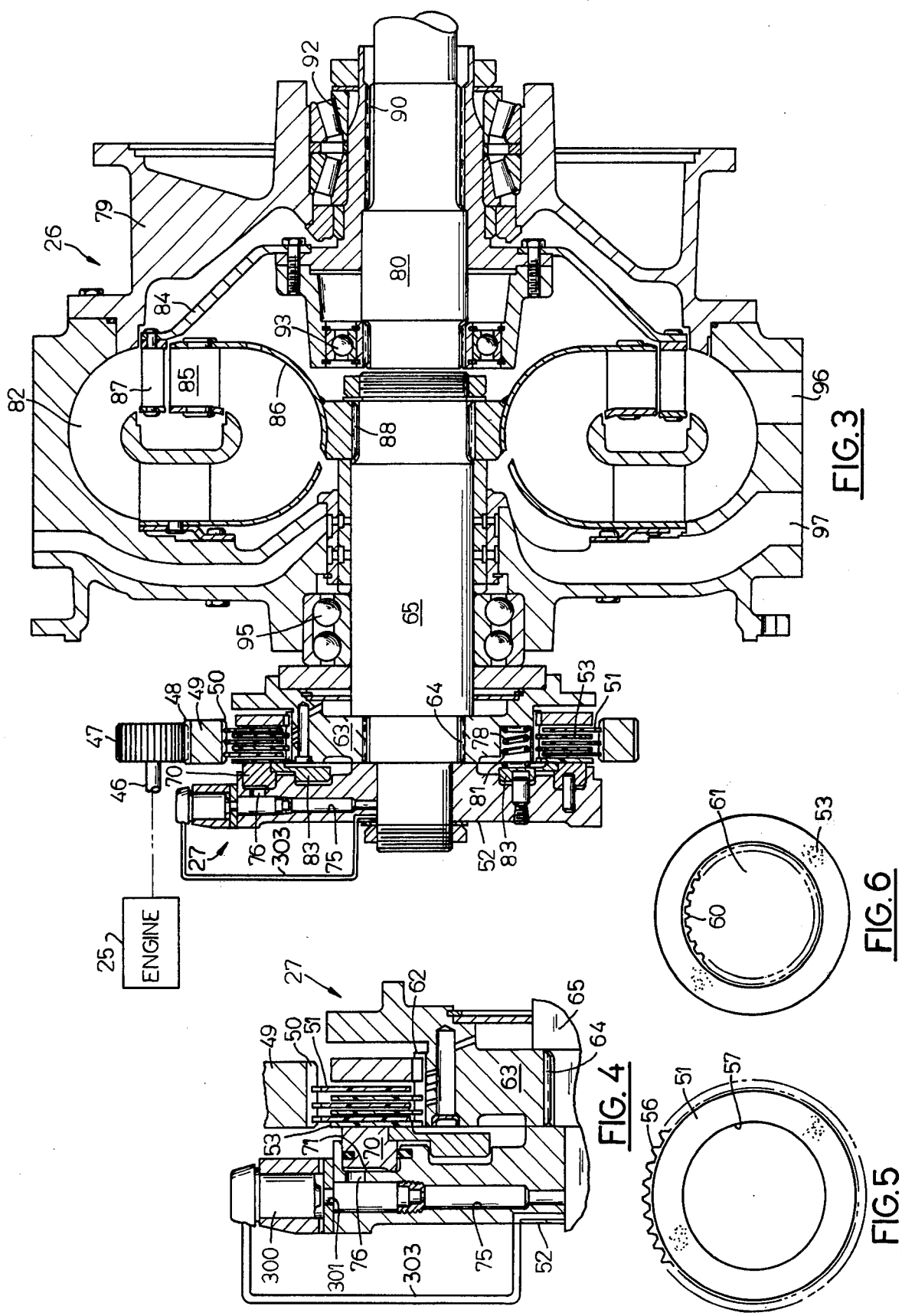

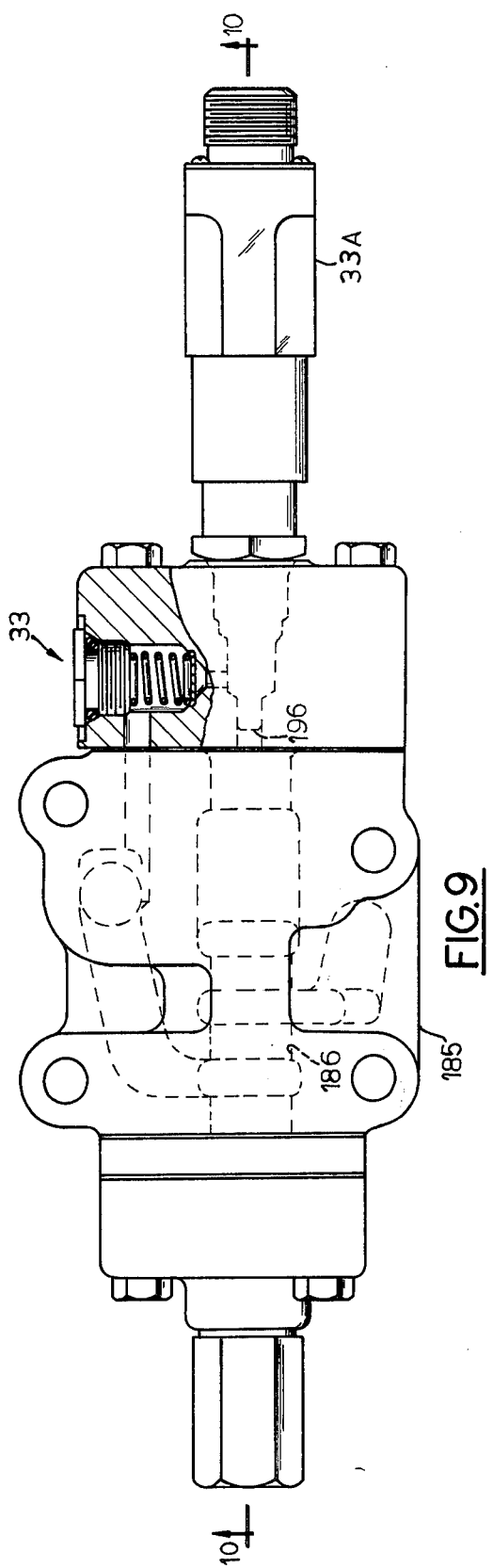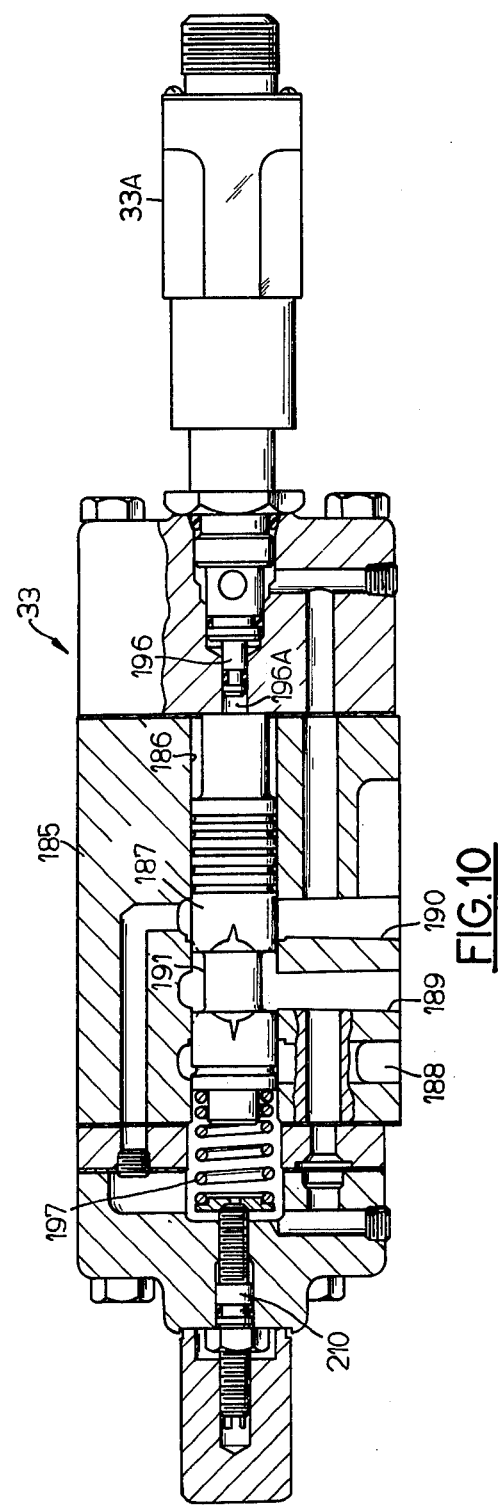

SWING CONTROL FOR CRANE

BACKGROUND OF THE INVENTION

1. Field of Use

This invention relates generally to power transmission systems such as are used for controlling the swing mechanism in mobile cranes, or the like. In particular, it relates to power transmission systems comprising a torque converter driven by a prime mover through a modulatable torque converter clutch, and a transmission driven by the torque converter and comprising a pair of alternately operable modulatable transmission clutches.

2. Description of Prior Art

In some apparatus, such as cranes and power shovels, it is common to employ a prime mover, such as an internal combustion engine, to drive a torque converter to raise or lower the crane or shovel boom. However, the use of an engine-driven torque converter transmission system to swing the upper section of a machine on which a boom is mounted is known but not widespread. For example, in some prior art systems, a single prime mover is employed to drive two separate torque converters, one for effecting hoisting and boom control functions, and the other for effecting operation of the swing mechanism by means of a pair of "dry" type friction clutches. In such systems, the dry-type clutches in the swing mechanism are subject to wear, but wear can be reduced by modulating the speed of the torque converter which furnishes power for the swing clutches. Furthermore, modulation of the torque converter for the swing clutches reduces shaking and vibration which can become severe and dangerous, particularly when relatively long booms are swung. U.S. Pat. Nos. 3,376,981 and 3,221,896, disclose examples of prior art type transmission systems of present interest.

SUMMARY OF THE INVENTION

In accordance with the present invention, a power transmission system for swinging the upper section of a mobile crane to the right and left comprises a prime mover or engine, a torque converter driven by the engine and a swing transmission driven by the torque converter. A modulatable torque converter clutch is connected between the engine and the torque converter. The swing transmission includes a modulatable right swing transmission clutch and a modulatable left swing transmission clutch for operating mechanisms which are selectively engageable to swing the upper section of the crane either to the right or left, respectively. The torque converter clutch and each of the swing clutches are modulated by means of their own separate electric solenoic control valve. The three control valves are actuated by means of an operator's control lever which is selectively movable from neutral to right or left swing positions to operate an electric swing control which provides an electric control signal to the torque converter clutch control valve and to the selected one of the transmission swing clutch control valves. The right and left transmission swing clutches are constructed so that each is biased into a minimum engaged position, even when the clutch is not actuated. This provision is made so that further engagement of either of these transmission swing clutches is not accompanied by excessive shock or vibration, and so that the non-selected transmission swing clutch exerts a slight drag or braking action as the crane is swung, thereby providing for better swing control. The swing control is constructed and operates so that modulation of the torque converter clutch is carried out at a different (slower) rate than the modulation of the selected transmission swing clutch, thereby insuring that the selected transmission swing clutch is fully engaged before the torque converter clutch is fully engaged, thereby insuring that the final modulation is carried out by the torque converter clutch. The swing control is further provided with means for sensing the output speed of the torque converter (the input speed of the transmission) and for governing the control valve for the torque converter clutch in accordance with speed.

All three of the aforedescribed clutches are "wet" type (oil cooled), hydraulically applied modulatable clutches. A power transmission system in accordance with the present invention is substantially smaller and relatively cheaper to manufacture and maintain than prior art type systems wherein, for example, the cost of dry-type swing clutch replacement may run as high as $1,200 per month per clutch. Furthermore, a power transmission system in accordance with the invention is advantageous in that it enables the initial heavy load to be imposed on the torque converter clutch rather than on the swing transmission clutches. As a result, it is possible to use smaller swing transmission clutches. Also, by constructing and operating the swing transmission clutches so that the non-actuated clutch is in a minimum engaged condition, the swinging action of the upper section of the crane is carried out more smoothly and can be more readily terminated. Other objects and advantages of the invention will hereinafter appear.

DRAWINGS

FIG. 1 is a schematic diagram of a power transmission system for the swing mechanism of a crane in accordance with the present invention, and shows a prime mover, a torque converter having a modulatable torque converter clutch, a swing transmission having partially engaged modulatable right and left independently operable swing transmission clutches, solenoid operated clutch control valves for the three clutches, a manually operable electric swing control for the clutch control valves, and a governor for the control valve of the torque converter clutch;

FIG. 2 is a graph depicting the relationship between movement of the operator's control lever of the swing control and torque conditions in both the torque converter clutch and that swing transmission clutch which is selected for operation;

FIG. 3 is a cross-section view of the torque converter and shows the location of the modulatable torque converter clutch therein;

FIG. 4 is an enlarged cross-sectional view of a portion of the torque converter clutch shown in FIG. 3;

FIG. 5 is an elevation view of a clutch drive plate shown in FIGS. 3 and 4;

FIG. 6 is an elevation view of a clutch driven plate shown in FIGS. 3 and 4;

FIG. 9 is a top plan view, partly in cross section, of one of the clutch control solenoid valves shown in FIG. 1;

FIG. 10 is an enlarged cross-section view of the clutch control solenoid valve taken on line 10—10 in FIG. 9;

DESCRIPTION OF A PREFERRED EMBODIMENT

Figure 7:
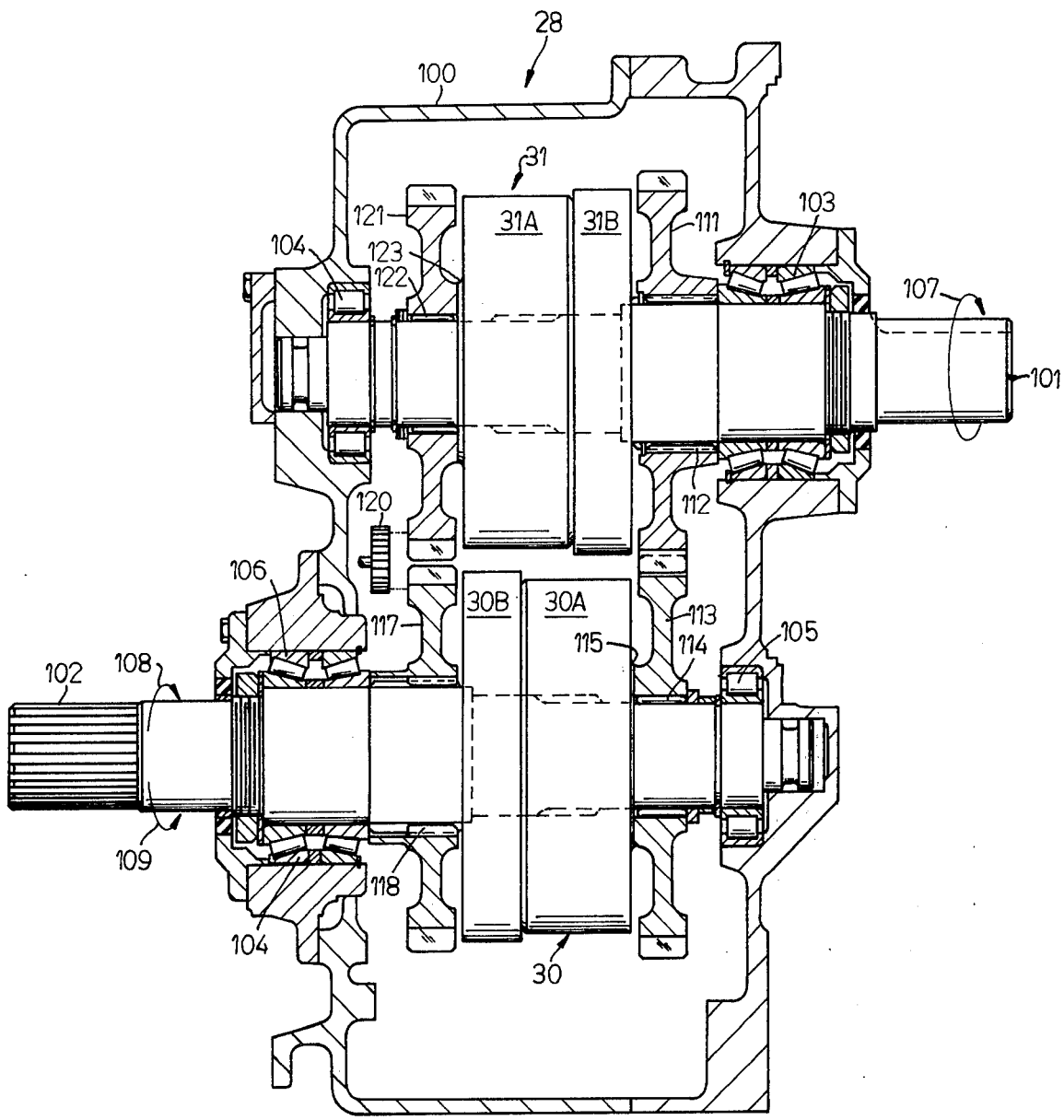
FIG. 7 is a cross-section view of the swing transmission and shows the right and left swing transmission clutches therein.

Referring to FIG. 1, the numeral 10 designates a mobile crane (shown in a top plan view) having a lower secion 11, including crawler tracks 12, and a horizontally rotatable upper section 13, including a boom 14. Upper section 13 is mounted on the lower section 11 and is adapted to be swung or rotated in a horizontal plane either to the right or to the left in the direction of the arrows 15 and 16, respectively. It is to be understood that crane 10 is of conventional construction and that the upper section 13 can be swung relative to the lower section 11 by conventional means such as a driven pinion gear 20 which is in constant mesh with a large ring gear 21 secured to upper section 13.

FIG. 1 further shows a power transmission system in accordance with the invention for driving the pinion gear 20 to swing upper section 13 in either direction. It is to be understood that all of the hereinafter described components in the power transmission system are mounted on crane 10 in a conventional manner.

Generally considered, the power transmission system for swinging upper crane section 13 comprises a prime mover or engine 25, a torque converter 26, a modulatable torque converter clutch 27 connected between engine 25 and torque converter 26, and a swing transmission 28 including a modulatable right swing transmission clutch 30 and a modulatable left swing transmission clutch 31. The torque converter clutch 27 and each of the swing clutches 30 and 31 are modulated by means of their own separate electric solenoid control valves 33, 34, and 35, respectively. The three control valves 33, 34, 35 are actuated in response to an operator's control lever 37 which is selectively movable from neutral to right or left swing positions to operate and electric swing control 40 which provides an electric control signal to the torque converter clutch control valve 33 and to either one or the other of the transmission swing clutch control valves 34 and 35. The right and left transmission swing clutches 30 and 31 are constructed so that each is biased into minimum engaged position, even when not actuated, so that further engagement of either of these transmission swing clutches 30 and 31 is not accompanied by excessive shock or vibration, and so that the non-selected transmission swing clutch 30 or 31 exerts a slight drag as the crane upper section 13 is swung, thereby providing for better swing control. The swing control 40 is constructed so that modulation of the torque converter clutch 27 is carried out at a different (slower) rate than the modulation of the selected transmission swing clutch 30 and 31, thereby insuring that the selected transmission swing clutch 30 or 31 is fully engaged before the torque converter clutch 27 is fully engaged, thereby insuring that the final modulation is carried out by the torque converter clutch 27. The swing control is further provided with means including a speed pickup or sensor 42 for sensing the output speed of output shaft 80 of the torque converter 26 (the input speed of input shaft 101 of the transmission 28) and a governor 45 for receiving the speed signal from pickup 42 and for governing operation of the control valve 33 for the torque converter clutch 27 in accordance with speed.

Referring to FIG. 2, the graph therein depicts the relationship between the extent of movement of the operator's control lever 37 and torque conditions at the torque converter turbine 84, and whichever one of the swing transmission clutches 30 and 31 is selected for operation. In the graph, the axis X is calibrated in the percentage of handle throw between 0% (neutral) position and 100% in either right or left direction. The axis Y is calibrated in torque (foot-pounds). The curve designated A indicates torque at the converter output shaft 80 due to conditions within the torque converter clutch 27 and the curves designated B, D and C, E indicate the torque conditions within the selected one of the swing transmission clutches 30 and 31, respectively. The reason why there are two curves representing conditions within each transmission clutch 30, 31 is due to the effects of static and dynamic coefficients of friction. During operation from a neutral condition (zero swing speed) to clutch engagement for either swing direction, the selected transmission clutch 30 or 31 would have the torque capability as indicated by curves D or E in FIG. 2 because the clutch plates 151 and 153 would be in a locked up condition (zero relative motion between individual plates). During a swing reversal, the individual clutch plates 151 and 153 have relative motion therebetween and are being brought into synchronization (locked up) in response to motion of the control handle 37 which causes the clamping force on the clutch plates to be increased. In this case, the transmission clutch torque within the swing transmission clutches 30 and 31 would follow either the B or C curve, respectively. As the graph in FIG. 2 shows, when the control handle 37 is in the neutral (0%) position, torque converter clutch 27 and the swing transmission clutches 30 and 31 are all at a minimum engaged condition. The graph in FIG. 2 further shows that as control handle 37 is moved right or left from the neutral position, the rate of engagement of the swing transmission clutch 30 or 31 is faster than that of the torque converter clutch 27. As a result, clutch 30 or 31 becomes fully engaged while clutch 27 is still being modulated toward fully engaged position.

In the following description, each of the components or elements in the power transmission system shown in FIG. 1 is described in detail. It is to be understood that the solenoid-operated clutch control valves 33, 34, and 35 are identical to each other in construction and mode of operation, and, therefore, only the torque converter clutch control valve 33 will be described. Furthermore, since the right and left transmission clutches 30 and 31 are identical, only the right clutch 30 will be described in detail.

The Torque Converter Clutch

Referring to FIG. 3, the engine 25 comprises a drive shaft 46 which, for example, normally rotates at a constant speed of 2000 rpm when the engine is running. Engine drive shaft 46 drives a spur gear 47 which is in constant mesh with the exterior teeth 48 on a ring gear 49. Ring gear 49 also has interior teeth 50 which are in constant mesh with drive plates 51 which are part of torque converter clutch 27.

Referring to FIGS. 3 and 4, the torque converter clutch 27 comprises a driven member 52, a set of drive plates 51 which are continually driven or rotated by ring gear 49 when engine 25 is running, and a set of driven plates 53. The clutch 27 is constructed so that it has a minimum disengaged position and can be modulated to a fully engaged position or to any partially engaged position. Clutch 27 is hydraulically applied and spring-released and is controlled or modulated by the solenoid clutch control valve 33, hereinafter described.

Clutch 27 comprises a plurality of spaced-apart drive plates 51 and each drive plate 51 has the general configuration shown in FIG. 5. As FIG. 5 shows, each clutch plate 51 has a set of outwardly projecting teeth 56 around its outer periphery and is provided with a central opening 57.

As FIG. 3 shows, the teeth 56 of the plates 51 are in constant mesh with the inner teeth 50 on ring gear 49. The drive plates 51 are in constant rotation when ring gear 49 is rotating, whether the torque converter clutch 27 is engaged or disengaged.

Torque converter clutch 27 also comprises a plurality of spaced-apart driven plates 53 and each driven plate 53 has the configuration shown in FIG. 6. As FIG. 6 shows, each driven plate 53 has a set of inwardly projecting teeth 60 around the periphery of its central opening 61. The driven plates 53 are interposed between the drive plates 51 as shown in FIGS. 3 and 4.

As FIGS. 3 and 4 show, the teeth 60 on the driven plates 53 are engaged in axially sliding relationship with splines 62 formed around the periphery of a hub 63. The hub 63 has a splined central opening 64 for accommodating the splined portion of a shaft 65 and is spline-connected to the shaft so that rotation of the hub 63 effects rotation of the shaft 65. As FIG. 3 shows, the shaft 65 serves as the output shaft for torque converter clutch 27 and as the input shaft for the torque converter 26.

Means are provided in clutch 27 to selectively force the drive plates 51 and the driven plates 53 into face-to-face engagement so that power may be transmitted from the drive plates 51 to the driven plates 53 and thereby effect rotation of the driven plates 53, the hub 63 and the shaft 65. It is to be understood that torque converter clutch 27 is a fully modulatable clutch and that the amount of power transmitted from the drive plates 51 to the driven plates 53 is proportional to the amount of pressure applied to force the plates together. The means in clutch 27 for forcing the drive plates 51 and driven plates 53 together comprise an annular piston 70 which is disposed in an apply cavity 71 in the stationary member 52, which apply cavity serves as a cylinder for the piston. The piston 70 is movable from a clutch disengaged position shown in FIGS. 3 and 4 to any partially engaged or to a fully engaged position (not shown) by means of hydraulic fluid or oil which is supplied through valve 33 from a source of pressurized fluid, such as a pump 72 and reservoir 73 shown in FIG. 1, through a passage 75 in the stationary member 52 and through a port 76 communicating between the passage 75 and the apply cavity 71.

The torque transmitting ability of a friction clutch such as 27 will tend to vary considerably when in use, and this variation is due to several things, one of which is the fact that the coefficient of friction in any given clutch changes rapidly during its use. Because of this, the control of clutch 27 would be very difficult, particularly since clutch 27 is used to feed into torque converter 26, and this would result in considerable instability of the power drive. It is, therefore, desirable to provide a centrifugally operated control valve 300, as shown in FIGS. 3 and 4, which acts as a governor for controlling the speed of the input member of the clutch 27, independently of variations in the coefficient of friction in the clutch itself. Fluid pressure applied in the top of valve 300 from passage 303 acting in cooperation with centrifugal force causes the valve to close off the exhaust port 301 enabling pressure to build up in the apply cavity 71. The valve 300 will then control the speed setting and compensate for any changes in plate friction in the clutch. A suitable valve for use as valve 300 is shown and described in detail in U.S. Pat. No. 3,352,395; issued Nov. 14, 1967 to Conrad R. Hilpert for "Friction Clutch Having Centrifugally Operated Valve Means," which patent is assigned to the same assignee as the present application.

Means are also provided in clutch 27 for biasing the piston 70 toward clutch disengaged position and take the form of a plurality of helical compression springs, such as spring 78 shown in FIG. 3, which are disposed in bores, such as bore 81 shown in FIG. 3, in the hub 63. The springs 78 bear against an annular return plate 83 which is engageable with the annular piston 70. When the clutch 27 is partially or fully engaged, the shaft 65 rotates and transmits torque to the torque converter 26 in proportion to the extent of modulation or engagement of the torque converter clutch 27.

The Torque Converter

As hereinbefore explained, the output shaft 65 of torque converter clutch 27 also serves as the input shaft 65 for the torque converter 26. Power from shaft 65 is transmitted through torque converter 26 to the output shaft 80 of the torque converter. As FIG. 3 shows, the torque converter 26 comprises a housing 79 having a generally toroidal cavity or passage 82 within which a rotatable impeller 86 is mounted for driving a rotatable turbine 84 by means of oil flow therebetween. Impeller 86 comprises a plurality of impeller blades 85 and turbine 84 comprises a plurality of turbine blades 87. The impeller 86 is spline-connected to shaft 65 at 88 and is rotated by input shaft 65. The turbine 84 is spline-connected to turbine output shaft 80 at 90 and drives output shaft 80. The output shaft 80 and impeller 84 are supported for rotation on housing 79 by means of an anti-friction roller bearing assembly 92 and a ball bearing assembly 93. The torque converter input shaft 65 is supported for rotation on housing 79 by means of a roller bearing assembly 95. Housing 79 is provided with a cooling oil inlet passage 96 through which oil is supplied to toroidal passage 82 and with an outlet passage 97 through which oil from passage 82 exits. The oil in passage 82 is forced by the blades 85 of driven impeller 86 against the blades 87 of turbine 84 to transmit power therebetween and is circulated through passage 82 from inlet 96 to outlet 97 for cooling purposes.

Swing Transmission and the Swing Transmission Clutches

As FIG. 7 shows, the swing transmission 28 comprises a housing 100 in which the swing transmission clutches 30 and 31 are disposed and into which a transmission input shaft 101 extends and from which a transmission output shaft 102 extends. As FIG. 1 shows, the input shaft 101 is mechanically connected to torque converter output shaft 43 and is driven thereby in the direction of the arrow 107 shown in FIG. 7. Input shaft 101 is supported for rotation on housing 100 by means of roller bearing assemblies 103 and 104. Output shaft 102 is supported for rotation on the housing 100 by means of the bearing assemblies 105 and 106. Whereas input shaft 101, when driven, always rotates in the direction of arrow 107, the output shaft 102 is adapted to be rotated either in the direction of the arrow 108 or in the opposite direction as indicated by the arrow 109, depending on which clutch 30 or 31 is being modulated.

As FIG. 7 shows, a gear 111 is spline-connected at 112 to input shaft 101. Gear 111 is in constant mesh with a gear 113 which is mounted for relative rotation on output shaft 102 by means of a roller bearing assembly 114. As hereinafter explained in detail in connection with FIG. 8, the clutch 30 has two relatively rotatable sections designated 30A and 30B and the clutch 31 also has two relatively rotatable sections 31A and 31B. The gear 113 is rigidly connected as by welding at 115 to section 30A of clutch 30. A gear 117 is spline-connected as at 118 to output shaft 102. The gear 117 is connected through an idler gear 120 to a gear 121 which is mounted for relative rotation on input shaft 101 by a roller bearing assembly 122. The gear 121 is rigidly connected as by welding at 123 to section 31A of clutch 31.

As hereinafter explained, each of the clutches 30 and 31 are constructed so that it is modulatable between a minimum engaged position, through partially engaged positions to a fully engaged position. It is to be further understood that the clutches 30 and 31 are controlled so that when the control lever 37 is in the neutral position, both clutches are in the minimum engaged (non-actuated) position. However, when control lever 37 is moved from neutral position to either right or left, then clutch 30 or 31, respectively, will be modulated, i.e., operated from minimum engaged position into a partially engaged position toward fully engaged position, which is an intermediate position for control lever 37 as FIG. 2 shows. Referring to FIG. 7, the flow of power through transmission 28 is understood to be as follows, assuming that input shaft 101 is rotating in the direction of arrow 107. Assuming that neither clutch 30 nor 31 is actuated, output shaft 102 is stationary. Assuming that clutch 30 is partially or fully modulated, the power train is as follows: input shaft 101, gear 111, gear 113, clutch section 30A, clutch section 30B, and output shaft 102, which rotates in the direction of arrow 109. Assuming that clutch 31 is partially or fully modulated, the power train is as follows: input shaft 101, clutch section 31B, clutch section 31A, gear 121, gear 120, gear 117, and output shaft 102, the latter rotating in the direction of arrow 108.

Figure 8:
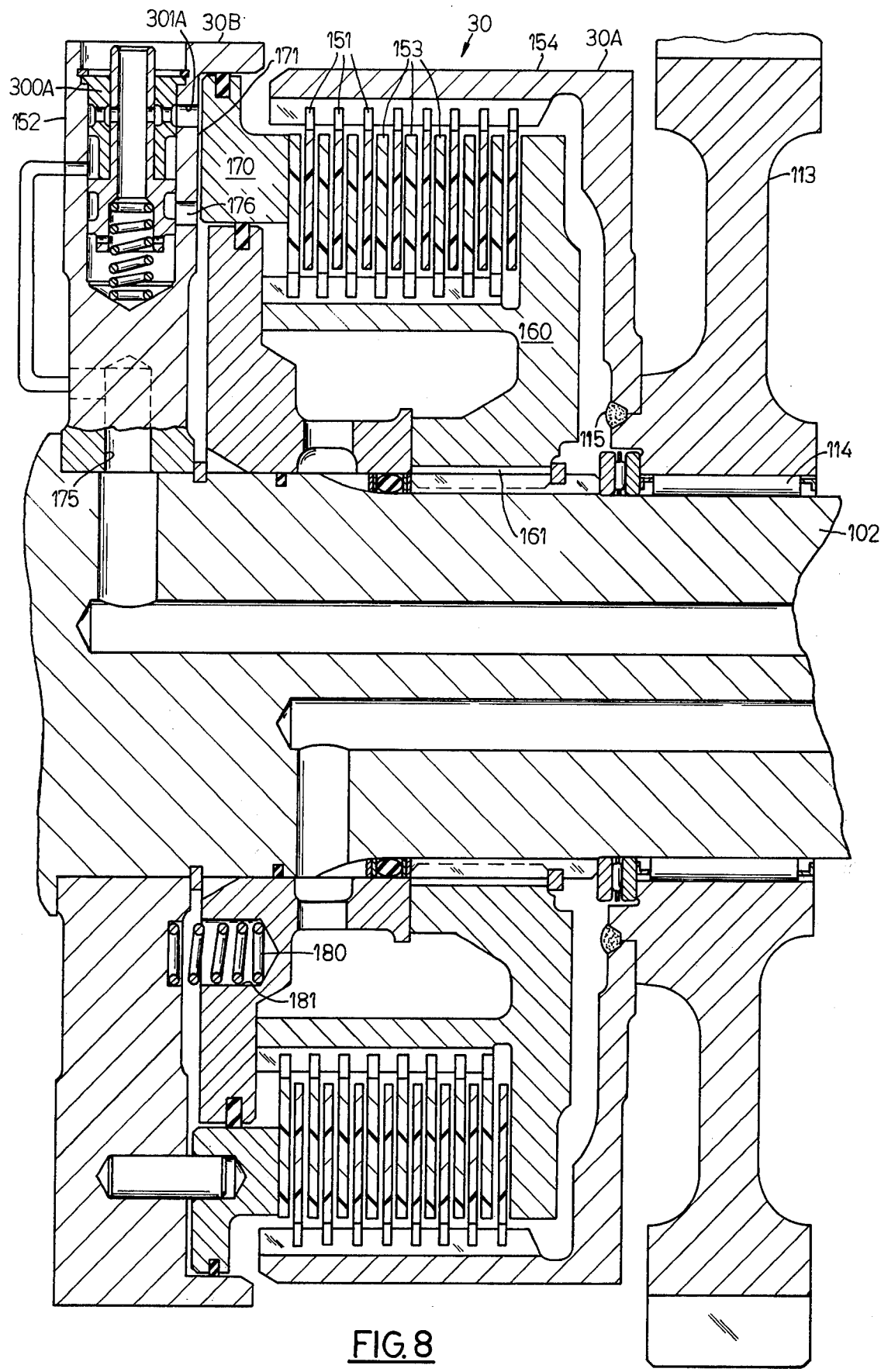
FIG. 8 is an enlarged cross-section view of one of the swing transmission clutches shown in FIG. 7.

FIG. 8 is an enlarged cross-sectional view of right swing transmission clutch 30 and shows the manner in which it is associated with gear 113 and output shaft 102. Since the right and left swing transmission clutches 30 and 31 shown in FIGS. 1 and 7 are substantially identical in construction, only clutch 30 is hereinafter described in detail. However, it will be noted from FIG. 7 that the clutches 30 and 31 are reversely mounted with respect to each other. As FIG. 8 shows, clutch 30 comprises a set of drive plates 151 and a set of driven plates 153 which are similar in general configuration to the drive plates and driven plates shown in FIGS. 5 and 6, respectively, hereinbefore described. As FIG. 8 shows, the drive plates 151 are spline-connected to a hollow cylinder housing 154 of clutch section 30A which is welded at 115 at gear 113. Thus, gear 113, housing 154 and the drive plates 151 rotate as a unit when gear 113 is being driven. The drive plates 151 are axially slideable with respect to housing 154. The driven plates 153 of clutch 30 are spline-connected to a hub 160 and the hub in turn is spline-connected as at 161 to output shaft 102. The driven plates 153 are interposed between the drive plates 151 and are axially slideable on the hub 160 so that when the plates 153 are being driven as a result of frictional engagement with the drive plates 151, the hub 60 and the shaft 102 rotate.

Means are provided in clutch 30 to force the drive plates 151 and the driven plates 153 into face-to-face engagement so that power may be transmitted from the drive plates 151 to the driven plates 153 and thereby effect rotation of the driven plates 153, the hub 160 and the shaft 102. Clutch 30 is a modulatable clutch and the amount of power transmitted from the drive plates 151 to the driven plates 153 is proportional to the amount of pressure applied to force the plates together. The means in clutch 30 for forcing the drive plates 151 and driven plates 153 together comprise an annular piston 170 which is disposed in an annular recess 171 in a member 152 which is connected to and rotatable with shaft 102. Recess 171 serves as a cylinder for the piston 170. The piston 170 is movable from a minimum engaged (non-actuated) position (not shown) by means of hydraulic fluid or oil which is supplied through valve 34 from a source of pressurized fluid, such as pump 72 and reservoir 73 shown in FIG. 1, through a passage 175 in the member 152 and through a port 176 to the groove 171.

As FIG. 8 shows, the swing transmission clutch 30 is generally similar to the modulatable torque converter clutch 27 in construction except that the transmission clutch 30 has more friction plates to transmit a larger torque capacity. Since the clutch 30 is designed to operate in a minimum engaged condition even when not actuated, the capacity for coolant oil is substantially increased (i.e., tripled) so as to provide for proper cooling and to reduce wear.

Figure 13:
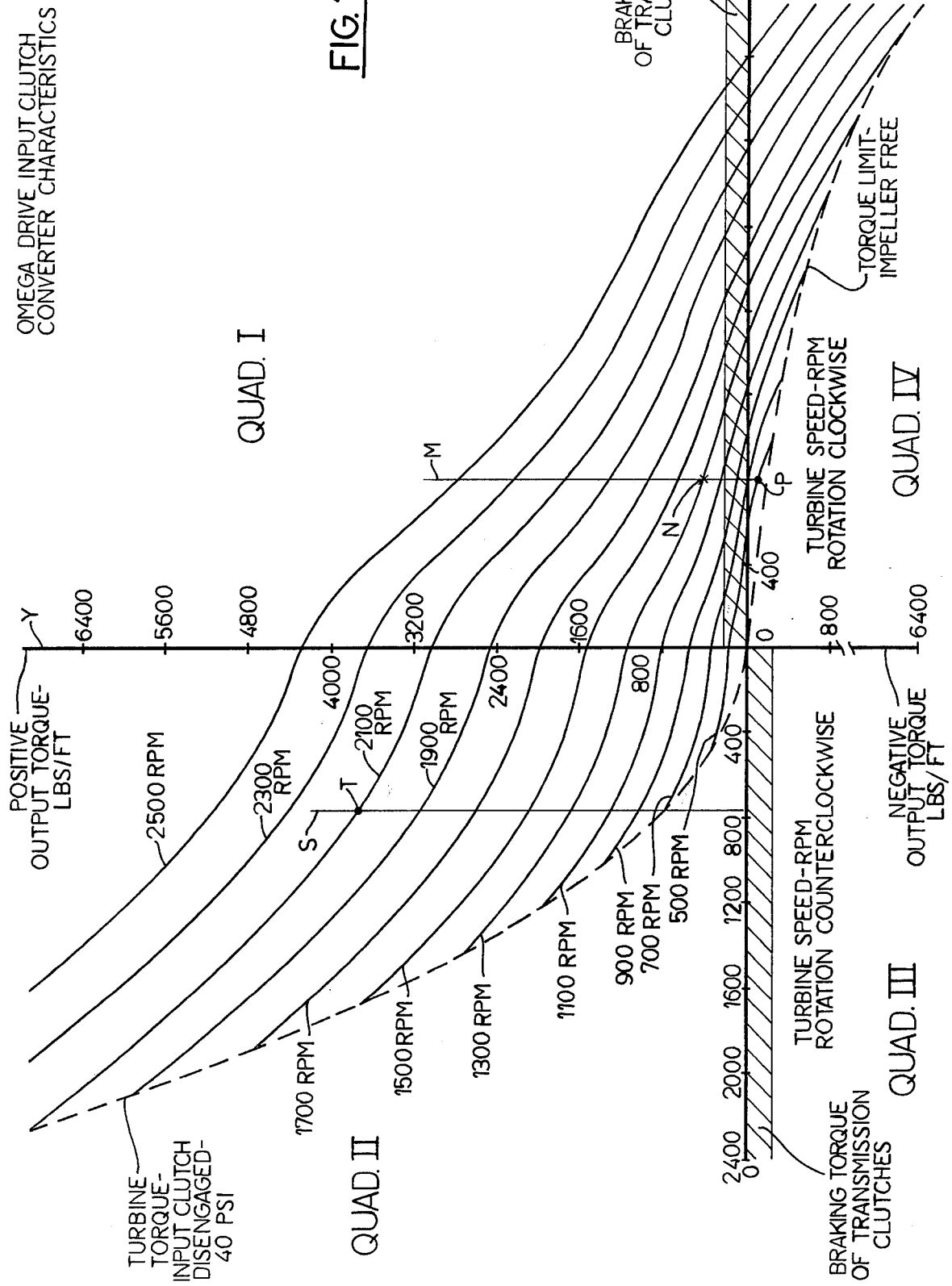
FIG. 13 is a graph depicting the torque converter output torque characteristics at various impeller speeds.

FIG. 13 shows a graph depicting the torque converter output torque characteristics at various impeller speeds. The curves were generated using constant speeds on impeller 86 while allowing the speed of turbine 84 to traverse from negative rotation (reverse driven by the load) in quadrant II, through normal forward operation in quadrant I and finally through quadrant IV where the torque converter 26 retarding effects are shown when the load tries to overdrive the turbine 84. Included in the graph in FIG. 13 are two crosshatched areas which are parallel to the X axis showing turbine speed in RPM and which indicate the braking torque exhibited by the biased transmission clutches 30 or 31. This braking torque always reacts in the direction to slow down the load (or swing speed). When the torque converter 26 is operated in quadrant II, the transmission braking torque adds to the converter braking. When in quadrant I, the transmission braking torque imposed by the clutches 30 or 31 subtracts from the converter output torque. And when in quadrant IV, the transmission braking torque again adds to the converter retarding torque. Noting the intersection point of the transmission braking torque with the positive Y axis showing positive output torque in foot pounds, it can be seen that the motion of turbine shaft 80 (or swing motion of crane 10) will not occur until the torque converter input clutch 27 is engaged sufficiently to generate approximately 250 lb-Ft of output torque. However, the bias level of clutch 27 must be below this in order to have zero speed in neutral. The net torque available to accelerate the crane upper section 13 is, then, turbine torque minus transmission braking torque. At a designated impeller speed, the runout point of the torque converter 26 will then be the point of intersection of a curve with the line M designating the speed limit set by the governor.

Following are examples of two swing cycles which serve to explain the system function. The first example assumes a movement of the swing control lever 37 to generate a full speed swing of crane upper 13, then dropping the control lever to the neutral position in a rapid motion. As the control lever 37 is moved forward, the speed of impeller 86 increases directly with lever position, accelerating to maximum. When turbine torque exceeds transmission braking torque, the crane upper 13 begins accelerating in the appropriate direction and continues until it reaches governed speed (e.g. 800 rpm as shown at line M in FIG. 13 which typically would produce a 2 rpm swing of crane upper 13). The governor 45 then cuts back the input pressure of clutch 27 to reduce the speed of impeller 86 to that required to hold 800 rpm turbine speed. For the foregoing example, assume that the speed of impeller 86 required to hold the turbine 84 at 800 rpm is 1300 rpm. Thus, the vertical line M in the graph in FIG. 13 from 800 rpm on the X axis to an intersection with the 1300 rpm impeller speed curve now defines an operating point on the converter characteristic graph designated N. When the operator drops the control lever 34 to neutral as rapidly as possible, the operating point now shifts immediately to quadrant IV until it intersects the 500 rpm impeller speed curve at point P. The reason the point drops to the 500 rpm impeller curve is because this operating point was chosen as the bias speed of the converter impeller 86 which generated an output torque of less than 250 lb-Ft. The torque available for slowing the swing speed of crane upper 13 is converter retarding torque plus the transmission braking torque. The converter torque remains additive to the transmission torque, until it crosses the X axis (e.g. at approximately 600 rpm), at which time, as seen from the curves in FIG. 13, the net torque is equal to transmission torque minus converter torque. The net braking torque then continues to decrease until it reaches a minimum at zero swing speed.

The second example of a swing cycle has the same starting conditions as in the first example, except that instead of dropping the swing control lever 37 to neutral, it is brought through neutral to a full reverse condition. During this condition, the operating point again drops to point P but then slides to an operating point T in quadrant II which is represented by the intersection of a vertical line S from the 800 rpm turbine speed, (negative rotation) at maximum impeller speed (2100 rpm) or engine speed at lockup. This operating point T will then slide down the 2100 rpm impeller curve slowing the swing speed of crane upper 13 to zero rpm with a net torque of converter torque plus transmission braking torque. When the speed of crane upper 13 reaches zero rpm, it then proceeds to accelerate in the position direction until it again reaches governor cutoff speed.

Solenoid-Operated Control Valve

Figure 12:
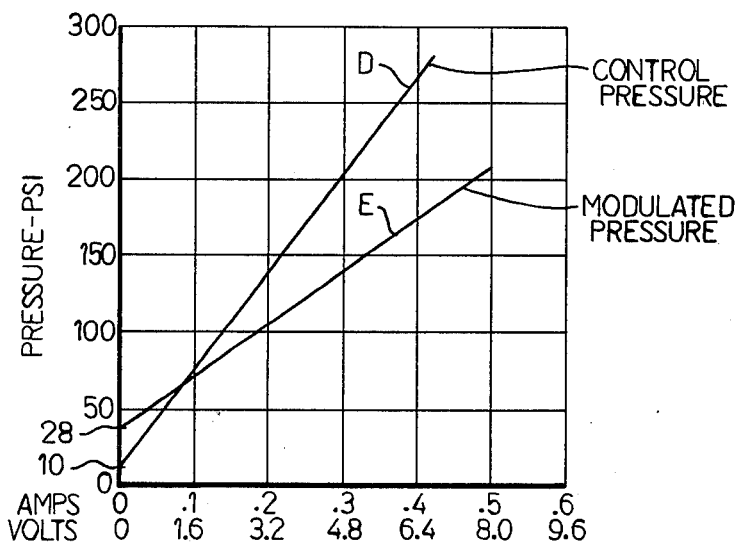
FIG. 12 is a graph depicting the fluid pressures in the clutch control solenoid valve.

FIG. 1 shows that the control valves 33, 34, and 35 control the supply of hydraulic operating fluid to their respective clutches from pump 72. As hereinbefore explained, the three control valves are identical to each other in construction and mode of operation. In practice, each control valve could take the form of control valve 33 shown in FIGS. 9 and 10. Control valve 33 comprises a valve body 185 having a bore 186 in which a valve spool 187 is slidably mounted. Valve body 185 has an oil inlet port 188 which is connectable to pump 72, an oil outlet port 189 which is connectable to the clutch being controlled by the valve, and an outlet 190 which is connectable to the sump or reservoir 73. Valve spool 187 is provided with a groove 191 which effects interconnection between the inlet port 188 and the outlet port 189 in a conventional manner. Valve spool 187 is axially movable between the fully closed or null position (shown in FIG. 10) and a fully open position by means of an electrically operated proportional solenoid 35A. Proportional solenoid 35A has a passage through a member 196 which controls oil flow to a chamber 196A adjacent one end of the spool 187. Oil pressure in chamber 196A effects movement of spool 187 leftward in FIG. 10. A biasing spring 197 is provided in passageway 186 of valve body 185 and serves to bias the valve spool 187 to null position. As will be understood, the movement of valve spool 187, and therefore the amount of operating fluid metered by valve 33 to operate or modulate its associate clutch, is proportional to the operating current applied to the proportional solenoid 35A. The proportional solenoid 35A may, for example, be operated by means of an electric circuit of the type shown in FIG. II. The graph in FIG. 12 depicts the relationship between the amperage and voltage applied to the proportional solenoid 35A and the amount of fluid pressure (in pounds per square inch) appearing at the pressure port 189 (line E) and in the chamber 196A (line D). The graph shown in FIG. 12 is merely exemplary and other electrical valves could be employed to achieve desired oil pressure levels for effecting appropriate operation or modulation of the clutches being operated by the control valves 33, 34, and 35.

The Control Circuit

Figure 11:
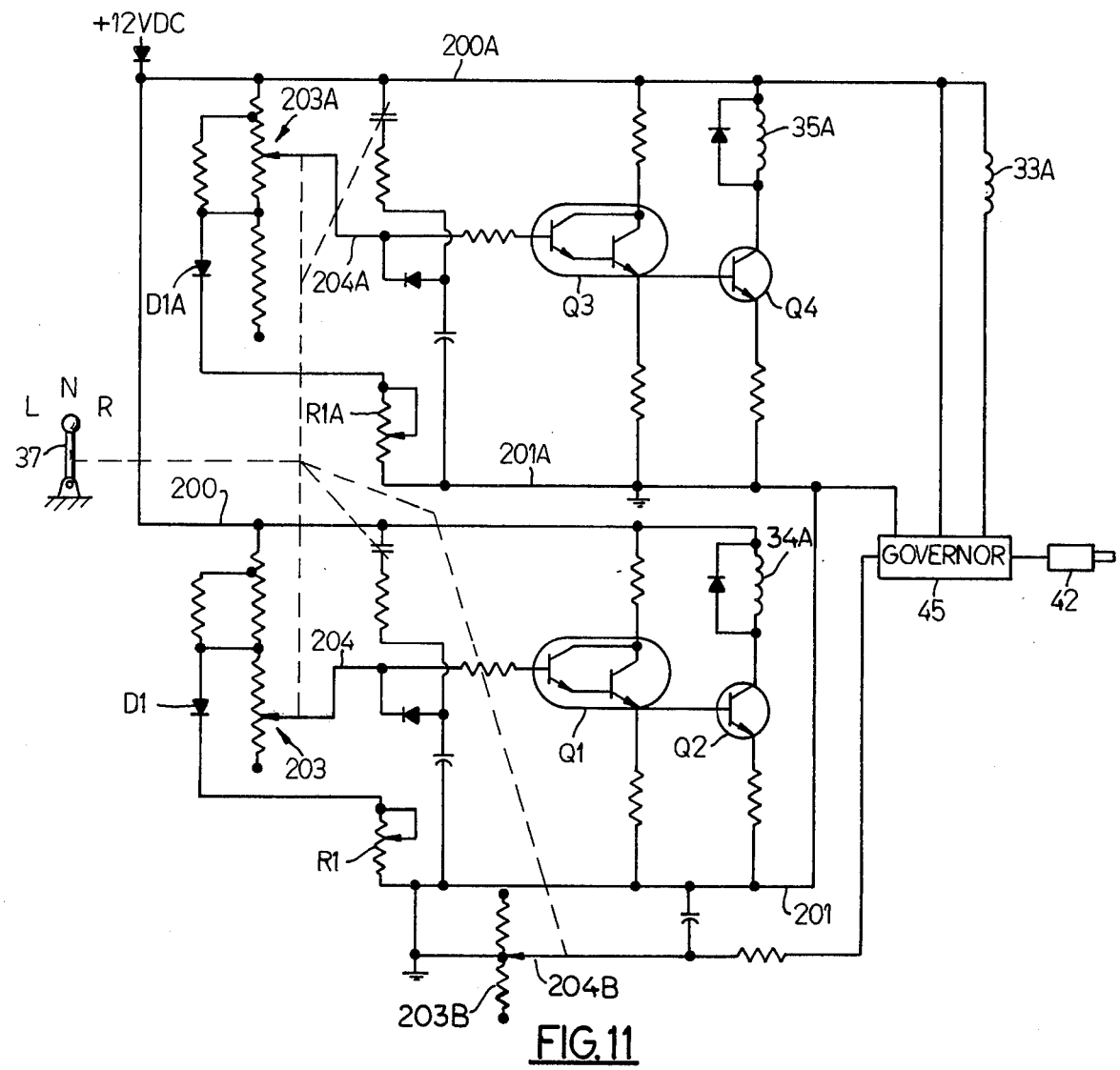
FIG. 11 is an electric circuit diagram of the swing control shown in FIG. 1.

Referring to FIG. 11, there is shown an electric circuit diagram for controlling the proportional solenoids 33A, 34A, and 35A for the control valves 33, 34, and 35, respectively. The control circuit comprises two portions which are substantially identical. The lower portion of the electric control circuit comprises a pair of d.c. supply lines 200 and 201 (ground) which are energizable, for example, from a 12 volt d. c. source. A potentiometer 203 is connected across the lines 200 and 201 in series with a diode D1 and a 500 ohm resistor R1. The potentiometer 203 has a movable contact 204 which is mechanically connected to and movable by means of the operator's control lever 37. The movable contact 204 of the potentiometer 203 provides a bias signal to the base of a transistor Q1 and the transistor Q1 controls a transistor Q2. The transistor Q1 amplifies the control signal to the base of power transistor Q2 through which operating power is supplied to the proportional solenoid 34A. The solenoid 34A is connected across the supply lines 200 and 201 in series with the emitter collector circuit of power transistor Q2.

The upper portion of the electric control circuit comprises a pair of d.c. supply lines 200A and 201A (ground) which are also energizable from the 12 volt d.c. source. A potentiometer 203A is connected across the lines 200A and 201A in series with a diode D1A and a 500 ohm resistor R1A. The potentiometer 203A has a movable contact 204A which is also mechanically connected to and movable by means of the operator's control lever 37. The movable contact 204A of the potentiometer 203A provides a bias signal to the base of a transistor $Q_3$ and the transistor $Q_3$ controls a transistor $Q_4$. The transistor $Q_3$ amplifies the control signal to the base of power transistor $Q_4$ through which operating power is supplied to the proportional solenoid 35A. The solenoid 35A is connected across the supply lines 200A and 201A in series with the emitter collector circuit of power transistor $Q_4$.

As FIG. 11 shows, each potentiometer 203 and 203A has an inactive area and they are constructed and mounted so that, for example, when contact 204 of potentiometer 203 is in the inactive area, the contact 204A of potentiometer 203A is in the active area, and vice-versa.

When the control lever 37 is in the neutral position, the torque converter clutch 27 and swing clutches 30 and 31 are in the minimum engaged position. When lever 37 is moved to effect a right swing movement of crane upper section 13, the movable contact 204 of potentiometer 203 is moved into the active area in proportion to the movement of lever 37, and movable contact 204B of potentiometer 203B moving the governor control point above ground, a current signal proportional to lever movement is provided to the torque converter clutch solenoid 33A and to the right swing clutch solenoid 34A. This increases apply pressure to converter clutch 27. Similarly, when control lever 37 is moved leftward from neutral position, the movable contact 204A of potentiometer 203A is moved into the active area and contact 204B of potentiometer 203B to raise governor control above ground, current flow proportional to control lever throw energizes the proportional solenoids 33A and 35A, resulting in appropriate action of their associated clutches.

As hereinbefore explained in connection with the graph in FIG. 2, the swing clutches 30 and 31 must become fully engaged before the torque converter clutch 27. This is accomplished by adjusting the null position of the valve spools 187 in the control valves 34 and 35 for the swing clutches 30 and 31, respectively, so that greater pressure is supplied by the control valves 34 and 35 to their respective clutches. As FIG. 10 shows, the null position of a valve spool 187 can be adjusted by means of an adjustment screw 210 which controls the extent to which the biasing spring 197 is compressed. Such an adjustment has the effect of changing the amount of current which needs to be applied to the proportional solenoid to effect a given amount of axial movement of the valve spool 187. The graph in FIG. 12 shows curves D and E and depicts how a given current applied to the proportional solenoid can result in a difference in oil pressure at the control valve outlet.

The Governor

Referring to FIG. 1, it is seen that the solenoid-operated control valve 33 controls the torque converter clutch 27. From a practical standpoint, it is desirable to limit the speed at which the upper section 13 of the crane can be swung, regardless of the extent of movement of the operator's lever 37. Accordingly, the operating signal from swing control 40 is furnished to proportional solenoid 33A through a governor 45 which in turn is responsive to a speed signal from the speed pickup 42 which is responsive to the speed of torque converter output shaft 43. The governor 45 and the speed pickup 42 may take the form of any known type of prior art device. In practice, an electronic governor available from the Barber Colman Co., 1300 Rock St., Rockford, Ill., and identified as their Part No. DYN1-10005, was found to be suitable.

The invention disclosed herein, is shown as employing electrically operated solenoid valves for effecting modulation of the clutches and a suitable electronic control is provided for operating the solenoid valves. It is to be understood, however, that other types of control means for effecting modulation of the clutches are intended to be within the scope of the invention as herein claimed. Furthermore, the power transmission system in accordance with the invention is disclosed as embodied in a movable crane but it is apparent that such a system could be employed in other apparatus and equipment.

We claim:

1. In a power transmission system:
a torque converter;
a modulatable torque converter clutch in said torque converter modulatable between a minimum engaged condition and a fully engaged condition;
a transmission connected to be driven by said torque converter;
at least one modulatable transmission clutch in said transmission modulatable between a minimum engaged condition and a fully engaged condition;
selectively operable control means for operating said clutches, said control means comprising an operator-controllable control member movable between a neutral position and at least one other position through an intermediate position therebetween, to enable selective modulation of said transmission clutch between minimum and fully engaged conditions as said control member is moved between said neutral position and said intermediate position, said control means further comprising means responsive to placement of said control member in said intermediate position whereby said transmission clutch is placed in fully engaged condition and to enable further movement of said control member between said intermediate position and said one other position to effect modulation of said torque converter clutch between partially engaged and fully engaged condition.

2. In a power transmission system:
a torque converter;
a modulatable torque converter clutch in said torque converter, said torque converter clutch being modulatable between a minimim engaged condition and a fully engaged conditiion;
a transmission connected to be driven by said torque converter;
a pair of alternately modulatable transmission clutches in said transmission, each transmission clutch being modulatable between a minimum engaged condition and a fully engaged condition; and
selectively operable control means for operating said torque converter clutch and a selected one of said transmission clutches, said control means comprising an operator-controllable control member movable between a neutral position and at least two other positions, said control member being movable through an intermediate position between said neutral position and each of said other positions, to enable selective modulation of a selected one of said transmission clutches between minimum and fully engaged conditions as said control member is moved between said neutral position and a corresponding intermediate position, said control means further comprising means responsive to placement of said control member in an intermediate position whereby said selected one of said transmission clutches is placed in fully engaged condition and to enable further movement of said control member between an intermediate position and one of said other positions to effect modulation of said torque converter clutch between partially engaged and fully engaged condition.

3. A system according to claim 2 wherein said clutches are of the fluid modulated type and wherein said control means comprises adjustable control valves for regulating fluid pressure to said clutches.

4. A system according to claim 3 wherein said control valves are operated by proportional solenoids and wherein said control means includes an electric circuit responsive to movement of said movable control member to control said solenoids.

5. A system according to claim 4 wherein said control means further comprises governor means responsive to the output speed of said torque converter for controlling the proportional solenoid for the control valve for said torque converter clutch to limit the extent of engagement of said torque converter clutch to thereby limit the output speed of said transmission.

6. In a power transmission system:
a torque converter;
a modulatable torque converter clutch in said torque converter; said torque converter clutch being modulatable between a minimum engaged condition and a fully engaged condition;
a transmission connected to be driven by said torque converter; at least one modulatable transmission clutch in said transmission;
said transmission clutch being modulatable between a minimum engaged condition and a fully engaged condition; and
selectively operable control means for operating said clutches, said control means comprising an operator-controllable control member movable between a neutral position and at least one other position through an intermediate position, to enable selective modulation of said transmission clutch between minimum and fully engaged conditions as said control member is moved between said neutral position and said intermediate position, said control means further comprising means responsive to placement of said control member in said intermediate position whereby said transmission clutch is placed in fully engaged condition and to enable further movement of said control member between said intermediate position and said one other position to effect modulation of said torque converter clutch between partially engaged and fully engaged condition.

7. In a power transmission system:
a torque converter;
a modulatable torque converter clutch in said torque converter; said torque converter clutch being modulatable between a minimum engaged condition and a fully engaged condition;
a transmission connected to be driven by said torque converter;
a pair of alternately modulatable transmission clutches in said transmission; each transmission clutch being modulatable between a minimum engaged condition and a fully engaged condition; and
selectively operable control means for operating said torque converter clutch and a selected one of said transmission clutches, said control means comprising an operator-controllable control member movable between a neutral position and at least two other positions, said control member being movable through an intermediate position between said neutral position and each of said other positions, to enable selective modulation of a selected one of said transmission clutches between minimum and fully engaged conditions as said control member is moved between said neutral position and a corresponding intermediate position, said control means further comprising means responsive to placement of said control member in an intermediate position whereby said selected one of said transmission clutches is placed in fully engaged condition and to enable further movement of said control member between an intermediate position and one of said positions to effect modulation of said torque converter clutch between partially engaged and fully engaged condition.

8. In a power transmission system:
a torque converter having an impeller and a turbine;
means for driving said impeller at constant speed;
a modulatable torque converter clutch in said torque converter;
said torque converter clutch being modulatable between a minimum engaged condition and a fully engaged condition;
a transmission connected to be driven by said turbine of said torque converter;
a pair of alternately modulatable transmission clutches in said transmission;
each transmission clutch being modulatable between a minimum engaged condition and a fully engaged condition;
a load driven by said transmission,
said load being movable in one direction when said torque converter clutch and one of said transmission clutches are modulated,
said load being moveable in an opposite direction when said torque converter clutch and the other of said transmission clutches are modulated;
and selectively operable control means for operating said torque converter clutch and a selected one of said transmission clutches, said control means comprising an operator-controllable control member movable between a neutral position and at least two other positons, said control member being movable through an intermediate position between said neutral position and each of said other positons, to enable selective modulation of a selected one of said transmission clutches between minimum and fully engaged conditions as said control member is moved between said neutral position and a corresponding intermediate position, said control means further comprising means responsive to placement of said control member in an intermediate position whereby said selected one of said transmission clutches is placed in fully engaged condition and to enable further movement of said control member between an intermediate position and one of said other positions to effect modulation of said torque converter clutch between partially engaged and fully engaged condition;
each of said transmission clutches when in minimum engaged condition exerting a braking action to slow the movement of said load in the selected direction of movement;
said torque converter clutch acting in conjunction with said transmission clutch to exert a further braking action to slow the movement of said load when the movement of said load is overhauling and tends to rotate said turbine toward reverse rotation.

* * * * *